(12) United States Patent
He et al.

(10) Patent No.: US 8,719,462 B1
(45) Date of Patent: May 6, 2014

(54) SYSTEMS AND METHODS FOR DISTRIBUTED LOG FILE PROCESSING

(71) Applicant: Google Inc., Mountain View, CA (US)

(72) Inventors: Shan He, Sunnyvale, CA (US); Haifeng Jiang, Sunnyvale, CA (US); Ashish Gupta, Sunnyvale, CA (US); Yuri Vasilevski, Mountain View, CA (US); Vinayak Ganeshan, Gilbert, AZ (US); Namit Sikka, Sunnyvale, CA (US); Navin Reginald Melville, Fremont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/055,537

(22) Filed: Oct. 16, 2013

(51) Int. Cl.
*G06F 7/00* (2006.01)
(52) U.S. Cl.
USPC .................................. 710/20; 710/7
(58) Field of Classification Search
None
See application file for complete search history.

(56) References Cited

U.S. PATENT DOCUMENTS

| | | | | |
|---|---|---|---|---|
| 5,892,917 | A * | 4/1999 | Myerson | 709/224 |
| 6,792,458 | B1 * | 9/2004 | Muret et al. | 709/224 |
| 7,725,900 | B2 * | 5/2010 | Sauermann | 718/105 |
| 7,752,628 | B2 * | 7/2010 | Sauermann | 718/105 |
| 8,224,938 | B2 * | 7/2012 | Sauermann | 709/223 |
| 8,380,681 | B2 | 2/2013 | Oltean et al. | |
| 8,387,064 | B2 * | 2/2013 | Archer et al. | 718/105 |
| 2005/0188075 | A1 * | 8/2005 | Dias et al. | 709/224 |
| 2009/0293093 | A1 * | 11/2009 | Igarashi | 725/115 |
| 2011/0307502 | A1 | 12/2011 | Boctor | |
| 2012/0042051 | A1 * | 2/2012 | Muret et al. | 709/219 |
| 2012/0290880 | A1 | 11/2012 | Bardack et al. | |
| 2013/0058342 | A1 | 3/2013 | Casado et al. | |
| 2013/0151535 | A1 * | 6/2013 | Dusberger et al. | 707/747 |

FOREIGN PATENT DOCUMENTS

EP   0 457 117 A2   11/1991
WO   WO 2013/081650 A1   6/2013

OTHER PUBLICATIONS

U.S. Appl. No. 14/043,548, filed Oct. 1, 2013, Melville et al.

* cited by examiner

*Primary Examiner* — Cheng-Yuan Tseng
(74) *Attorney, Agent, or Firm* — Foley and Lardner LLP; John D. Lanza

(57) ABSTRACT

A log file processing system includes a data storage device and a processing circuit configured to retrieve log file data from the data storage device and to create a bundle including a plurality of data chunks using the log file data. The processing circuit is configured to assign the bundle to a first processing pipeline of a set of multiple processing pipelines in response to a request from the first processing pipeline. The processing circuit is configured to store a global available timestamp for the bundle upon assigning the bundle to the first processing pipeline. The global timestamp is a time threshold before which the bundle is ineligible to be assigned to any of the multiple processing pipelines.

20 Claims, 5 Drawing Sheets

SYSTEMS AND METHODS FOR DISTRIBUTED LOG FILE PROCESSING

BACKGROUND

Large scale log file processing systems typically keep track of a huge number of growing log files, generate work units (e.g., bundles) from newly written log file chunks, and process the bundles to produce results. It is desirable to process each bundle exactly once to avoid duplicative processing. However, it is also desirable to implement multiple processing pipelines to improve the robustness of the system and to assure a minimum level of fault tolerance (e.g., to provide protection against pipeline failures/crashes). It is difficult and challenging to implement a multi-site log file processing system while ensuring minimal processing redundancy.

SUMMARY

One implementation of the present disclosure relates to a log file processing system. The log file processing system includes a data storage device and a processing circuit. The processing circuit is configured to retrieve log file data from the data storage device and to create a bundle comprising a plurality of data chunks using the log file data. The processing circuit is further configured to assign the bundle to a first processing pipeline of a set of multiple processing pipelines in response to a request from the first processing pipeline. The processing circuit is further configured to store a global available timestamp for the bundle upon assigning the bundle to the first processing pipeline. The global available timestamp is a time threshold before which the bundle is ineligible to be assigned to any of the multiple processing pipelines.

In one implementation, the processing circuit is configured to store a pipeline available timestamp for the bundle upon assigning the bundle to the first processing pipeline. The pipeline available timestamp is a time threshold before which the bundle is ineligible to be reassigned to the first processing pipeline. The pipeline available timestamp applies only to the first processing pipeline.

In one implementation, the processing circuit is configured to identify an estimated processing time of the first processing pipeline. The global available timestamp is a function of the estimated processing time.

In one implementation, the processing circuit is configured to receive a request to commit the bundle from a processing pipeline and to determine whether another request to commit the bundle was previously received. The processing circuit is configured to commit the bundle if another request to commit the bundle was not previously received, and to not commit the bundle if another request to commit the bundle was previously received.

In one implementation, the processing circuit is configured to assign a commit identifier to the bundle upon assigning the bundle to the first processing pipeline. The commit identifier distinguishes a copy of the bundle assigned to the first processing pipeline from a copy of the bundle assigned to another processing pipeline. The processing circuit is configured to send the commit identifier along with the bundle to the first processing pipeline.

In one implementation, the processing circuit is configured to receive a request to commit the bundle from a processing pipeline. The request to commit the bundle includes a commit identifier, which distinguishes a copy of the bundle assigned to the first processing pipeline from a copy of the bundle assigned to another processing pipeline. The processing circuit is configured select and perform one or more actions from a plurality of potential actions in response to the request to commit the bundle. The selection is based on the commit identifier. The processing circuit may further be configured to determine whether another request to commit the bundle was previously received, and to store the commit identifier in response to a determination by the processing circuit that another request to commit the bundle was not previously received. The processing circuit may further be configured to compare the commit identifier with a previously stored commit identifier for the bundle. If the commit identifier matches the previously stored commit identifier, the one or more actions selected and performed by the processing circuit may include reporting a commit success and not committing the bundle. If the commit identifier does not match the previously stored commit identifier, the one or more actions selected and performed by the processing circuit may include reporting a commit failure and not committing the bundle.

In one implementation, the plurality of data chunks is associated with an event time. Creating the bundle includes selecting the plurality of data chunks based on the event times. The processing circuit is configured to prioritize selecting data chunks having relatively earlier event times over selecting data chunks having relatively later event times.

In one implementation, the processing circuit is configured to determine the event times associated with the plurality of data chunks using an interpolative process. The process includes identifying a plurality of statistical data points for a log file. Each of the statistical data points includes a time value and a size value. The size value indicating a file size of the log file at a time corresponding to the time value. The process further includes interpolating a new data point between the plurality of statistical data points for the log file. The new data point has an interpolated time value. The time value is interpolated using a data offset associated with the data chunk.

In one implementation, creating the bundle includes selecting each of the plurality of data chunks. The processing circuit is configured to prioritize selecting data chunks from a plurality of different log files.

Another implementation of the present disclosure relates to a method for processing log files. The method is performed by a processing circuit of a log file processing system. The method includes retrieving log file data from a data storage device. The method further includes creating a bundle including a plurality of data chunks using the log file data. The method further includes assigning the bundle to a first processing pipeline of a set of multiple processing pipelines in response to a request from the first processing pipeline. The method further includes storing a global available timestamp for the bundle upon assigning the bundle to the first processing pipeline. The global available timestamp is a time threshold before which the bundle is ineligible to be assigned to any of the multiple processing pipelines.

In one implementation, the method further includes receiving a second request for the bundle from a second processing pipeline of the multiple processing pipelines. The method further includes identifying the stored global available timestamp for the bundle in response to the second request. The method further includes comparing the stored global available timestamp with a current time. The method further includes assigning the bundle to the second processing pipeline if the stored global available timestamp is earlier than the current time.

The method may further include storing a pipeline available timestamp for the bundle in a data storage device upon assigning the bundle to the first processing pipeline. The pipeline available timestamp is a time threshold before which the bundle is ineligible to be reassigned to the first processing pipeline. The pipeline available timestamp applies only to the first processing pipeline.

The method may further include receiving a second request for the bundle from the first processing pipeline. The method further includes identifying both the stored global available timestamp and the stored pipeline available timestamp for the bundle in response to the second request. The method further includes comparing both the stored global available timestamp and the stored pipeline available timestamp with a current time. The method further includes reassigning the bundle to the first processing pipeline if both the stored global available timestamp and the stored pipeline available timestamp are earlier than the current time.

Another implementation of the present disclosure relates to a log file processing system. The log file processing system includes a processing circuit configured to submit a request for a bundle to a state server. The bundle includes a plurality of log file data chunks. The processing circuit is configured to receive a bundle assignment from the state server in response to the request and to identify a commit identifier associated with the assigned bundle. The commit identifier distinguishes a copy of the bundle assigned to a first log file processing pipeline from a copy of the bundle assigned to a second log file processing pipeline. The processing circuit is further configured process the bundle and to submit a request to commit the processed bundle to the state server. The request to commit the bundle includes the commit identifier.

In one implementation, the processing circuit is configured to receive a global available timestamp for the assigned bundle from the state server. The global available timestamp is a time threshold past which the bundle is eligible to be assigned to any of multiple processing pipelines. The processing circuit is configured update the global available timestamp and store the updated global available timestamp in a data storage device.

In one implementation, the processing circuit is configured to identify an estimated processing time for the log file processing pipeline. The processing circuit is configured to use the estimated processing time to calculate the updated global available timestamp. The updated global available timestamp is a function of the estimated processing time.

In one implementation, the processing circuit is configured to track one or more log files. Tracking a log file includes collecting a plurality of statistical data points for the log file. Each of the statistical data points includes a time value and a size value. The size value indicating a file size of the log file at a time corresponding to the time value. Tracking a log file further includes storing the plurality of statistical data points in a data storage device.

DETAILED DESCRIPTION

Figure 1:
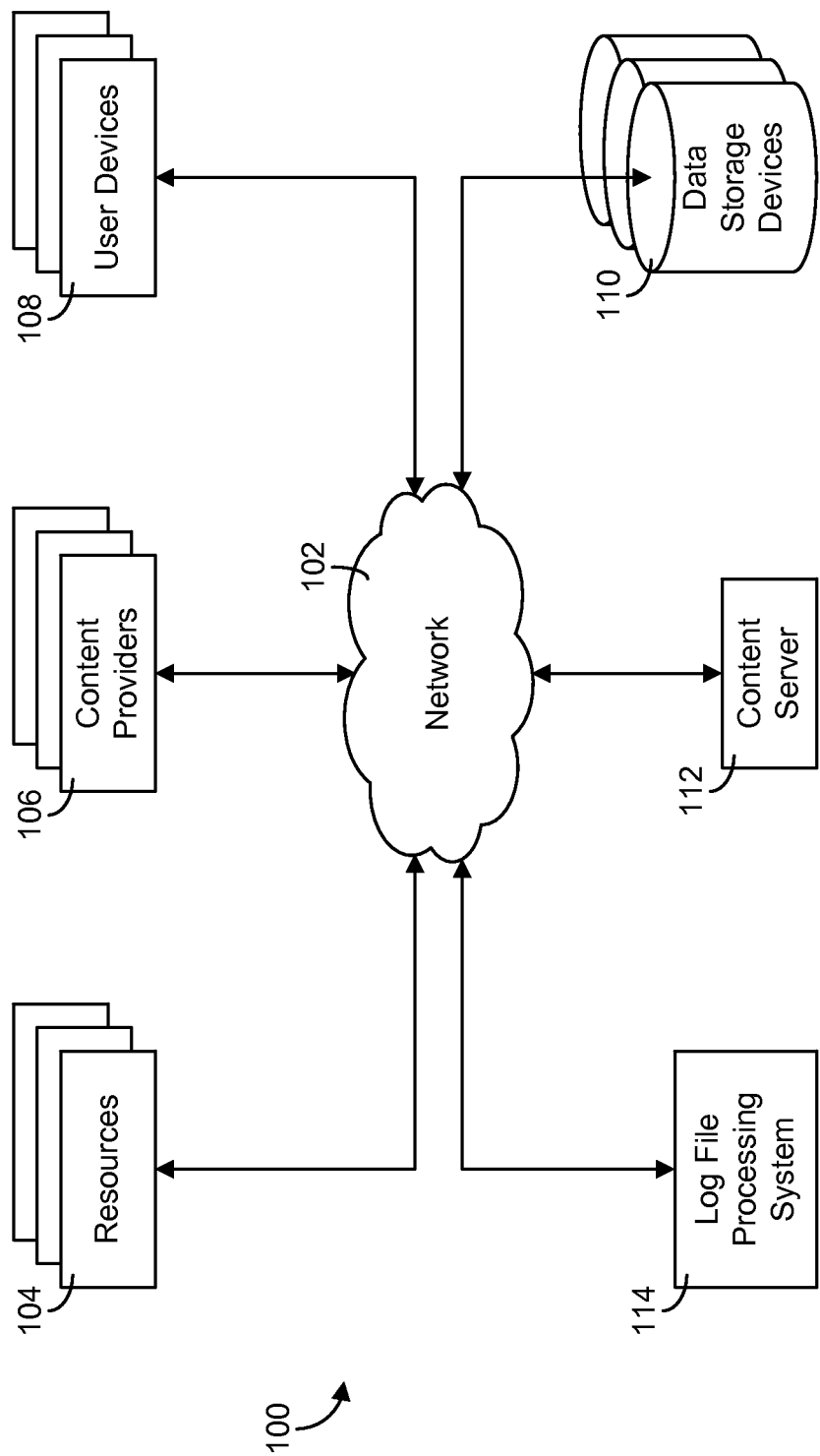
FIG. 1 is a block diagram of a computer system including a log file processing system configured to facilitate processing of one or more log files is shown, according to a described implementation.

Referring generally to the figures, systems and methods for distributed log file processing using multiple processing pipelines are shown and described. The systems and methods for distributed log file processing are described herein with reference to a content serving system; however, it should be understood that the distributed log file processing as described in the present disclosure may be applicable to other systems in which many log files are to be processed in multiple locations.

A content serving system may generally be configured to provide content to users via electronic devices. The content serving system may write log files to record user actions. User actions may include inputting a query to trigger display of the content, clicking on displayed content, etc. A log catcher may write the logs from individual serving machines to one or more centralized log locations. The logs may be stored in multiple locations, or in a single location. However, to improve fault tolerance (i.e., to "disaster proof" the content serving system) the logs may be replicated in multiple locations.

A log file tracker may proactively check for new log files and monitor the growth of the existing log files. The log file tracker may register new log files and file growth with a state server. The state server maintains metadata about each log file (e.g., log file basename, current size, file paths to replicated copies, byte ranges that have been processed, etc.). The state server may create bundles from multiple file chunks and assign the bundles to a plurality of local log processing pipelines. In some implementations, the state server is built on a fault tolerant and disaster free database-like infrastructure (e.g., paxosdb, spanner, etc.).

In one implementation, the state server prioritizes and bundles log file chunks based on the event times associated with each file chunk. To minimize processing delay, the state server may prioritize file chunks with an earlier event time. The state server may control the processing delay of the file chunks and the resource usage in the log file processing system. For example, the state server may segment larger file chunks into smaller file chunks, or delay processing of very small file chunks to that the file chunk has time to grow larger. The file chunks may be segmented to a desired size such that the file is not too fragmented but still small enough to control the processing delay.

The state server assigned each bundle to one of a plurality of local processing pipelines. Bundles are assigned to local processing pipelines upon request. The state server may receive the request and check whether the requested bundle is available for the local pipeline. Checking whether the bundle is available includes checking a global available timestamp (GAT) and pipeline available timestamp (PAT) of the bundle. The GAT and PAT are attributes of the bundle maintained at the state server. The GAT is a timestamp for which if the current time is newer than the GAT, the bundle is allowed to be assigned to any eligible pipeline. The PAT is a pair of values indicating a specific pipeline and timestamp, and the bundle is allowed to be assigned to the specific pipeline if the current time is newer than the timestamp.

Once a bundle is assigned to a local processing pipeline by the state server, the GAT and PAT are reset to later times in the future. If the timestamps then expire, the bundle is eligible to be sent to another local pipeline for processing. By carefully choosing values for the GAT and PAT, the state server may ensure that the majority of work is shared among multiple local processing pipelines and a minimal amount of work is duplicated. After bundles are processed by a local processing pipeline, the bundles are committed back to the state server. The state server may handle cases in which bundles are committed multiple times (e.g., bundles processed by more than one pipeline) by ignoring the second commitment or considering the second commitment a failure.

Other aspects, inventive features, and advantages of the systems and methods described herein will become apparent in the detailed description set forth below taken in conjunction with the accompanying drawings.

Referring now to FIG. 1, a block diagram of a computer system 100 is shown, according to a described implementation. In brief overview, computer system 100 is shown to include a network 102, resources 104, content providers 106, user devices 108, data storage devices 110, a content server 112, and a log file processing system 114. Computer system 100 may facilitate communication between resources 104, content providers 106, user devices 108, and log file processing system 114. For example, user devices 108 may request and receive resource content (e.g., web pages, documents, etc.) from resources 104 via network 102. Log file processing system 114 may receive user actions from resources 104 and/or user devices 108 when a resource of viewed or otherwise provided to user devices 108 (e.g., a pageview event, a conversion event, etc.), content is interacted with (e.g., clicked on, viewed, etc.), or another event occurs. In some implementations, resources 104 may include content item slots for presenting third-party content items from content providers 106. Log file processing system 114 may receive user actions from content providers 106 and/or user devices 108 when a content item is distributed or presented (e.g., an impression event) or upon a user interaction with a distributed content item (e.g., a click event, a hover event, etc.).

Computer system 100 is shown to include a network 102. Network 102 may be a local area network (LAN), a wide area network (WAN), a cellular network, a satellite network, a radio network, the Internet, or any other type of data network or combination thereof. Network 102 may include any number of computing devices (e.g., computers, servers, routers, network switches, etc.) configured to transmit, receive, or relay data. Network 102 may further include any number of hardwired and/or wireless connections. For example, user devices 108 may communicate wirelessly (e.g., via WiFi, cellular, radio, etc.) with a transceiver that is hardwired (e.g., via a fiber optic cable, a CAT5 cable, etc.) to a computing device of network 102.

Computer system 100 is shown to include resources 104. Resources 104 may include any type of information or data structure that can be provided over network 102. In some implementations, resources 104 may be identified by a resource address associated with each resource (e.g., a uniform resource locator (URL)). Resources 104 may include web pages (e.g., HTML web pages, PHP web pages, etc.), word processing documents, portable document format (PDF) documents, images, video, programming elements, interactive content, streaming video/audio sources, or other types of electronic information. Resources 104 may include content (e.g., words, phrases, images, sounds, etc.) having embedded information (e.g., meta-information embedded in hyperlinks) and/or embedded instructions. Embedded instructions may include computer-readable instructions (e.g., software code, JavaScript®, ECMAScript®, etc.) which are executed by user devices 108 (e.g., by a web browser running on user devices 108).

In some implementations, resources 104 may include content slots for presenting third-party content items. For example, resources 104 may include one or more inline frame elements (e.g., HTML "iframe" elements, <iframe> . . . </iframe>) for presenting third-party content items from content providers 106. An inline frame can be the "target" frame for links defined by other elements and can be selected by user agents (e.g., user devices 108, a web browser running on user devices 108, etc.) as the focus for printing, viewing its source, or other forms of user interaction. The content slots may cause user devices 108 to request third-party content items in response to viewing first-party resource content from resources 104.

Resources 104 may generate a variety of events when a user action occurs. For example, in some implementations, resources 104 generate events when resource content is viewed, requested, presented, accessed, or in response to any other type of action or occurrence with respect to resource content (e.g., pageview events). Resources 104 may generate events associated with third party content items presented via resources 104 (e.g., impression events, click events, etc.). In some implementations, resources 104 generate conversion events in response to an action or behavior (e.g., by user devices 108) which satisfies conversion criteria (e.g., online purchases, click-through paths, etc.). Resources 104 may communicate user actions relating to the events to log file processing system 114 via network 102.

Computer system 100 is shown to include content providers 106. Content providers 106 may include one or more electronic devices representing advertisers, resource operators, business owners, or other entities capable of producing content to be provided with a resource 104 to a user device 108. In some implementations, content providers 106 produce content items (e.g., an ad creative) for presentation to user devices 108. In other implementations, content providers 106 may submit a request to have content items automatically generated. The content items may be stored in one or more data storage devices local to content providers 106, within content server 112, or in data storage devices 110.

In some implementations, the content items may be advertisements. The advertisements may be display advertisements such as image advertisements, Flash® advertisements, video advertisements, text-based advertisements, or any combination thereof. In other implementations, the content items may include other types of content which serve various non-advertising purposes. The content items may be displayed in a content slot of resources 104 and presented (e.g., alongside other resource content) to user devices 108.

In some implementations, content providers 106 may submit campaign parameters to content server 112. The campaign parameters may be used to control the distribution of content items to user devices 108. The campaign parameters may include keywords associated with the content items, bids corresponding to the keywords, a content distribution budget, geographic limiters, or other criteria used by content server 112 to determine when a content item may be presented to user devices 108.

Content providers 106 may access content server 112 to monitor the performance of the content items distributed according to the established campaign parameters. For example, content providers 106 may access content server 112 and/or log file processing system 114 to review one or more behavior metrics associated with a content item or set of content items. The behavior metrics may describe the interactions between user devices 108 with respect to a distributed content item or set of content items (e.g., number of impressions, number of clicks, number of conversions, an amount spent, etc.). The behavior metrics may be based on user actions logged and processed by log file processing system 114.

Computer system 100 is shown to include user devices 108. User devices 108 may include any number and/or type of user-operable electronic devices. For example, user devices 108 may include desktop computers, laptop computers, smartphones, tablets, mobile communication devices, remote workstations, client terminals, entertainment consoles, or any other devices capable of interacting with the other components of computer system 100 (e.g., via a communications interface). For example, user devices 108 may be capable of receiving resource content from resources 104 and/or third-party content items from content providers 106 or content server 112. User devices 108 may include mobile devices or non-mobile devices.

In some implementations, user devices 108 include an application (e.g., a web browser, a resource renderer, etc.) for converting electronic content into a user-comprehensible format (e.g., visual, aural, graphical, etc.). User devices 108 may include a user interface element (e.g., an electronic display, a speaker, a keyboard, a mouse, a microphone, a printer, etc.) for presenting content to a user, receiving user input, or facilitating user interaction with electronic content (e.g., clicking on a content item, hovering over a content item, etc.). User devices 108 may function as a user agent for allowing a user to view HTML encoded content. User devices 108 may include a processor capable of processing embedded information (e.g., meta information embedded in hyperlinks, etc.) and executing embedded instructions. Embedded instructions may include computer-readable instructions (e.g., software code, JavaScript®, ECMAScript®, etc.) associated with a content slot within which a third-party content item is presented.

In some implementations, user devices 108 may be capable of detecting an interaction with a distributed content item. An interaction with a content item may include displaying the content item, hovering over the content item, clicking on the content item, viewing source information for the content item, or any other type of interaction between user devices 108 and a content item. Interaction with a content item does not require explicit action by a user with respect to a particular content item. In some implementations, an impression (e.g., displaying or presenting the content item) may qualify as an interaction. The criteria for defining which user actions (e.g., active or passive) qualify as an interaction may be determined on an individual basis (e.g., for each content item), by content providers 106, or by content server 112.

User devices 108 may generate a variety of user actions. For example, user devices 108 may generate a user action in response to a detected interaction with a content item. The user action may include a plurality of attributes including a content identifier (e.g., a content ID or signature element), a device identifier, a referring URL identifier, a timestamp, or any other attributes describing the interaction. User devices 108 may generate user actions when particular actions are performed by a user device (e.g., resource views, online purchases, search queries submitted, etc.). The user actions generated by user devices 108 may be communicated to log file processing system 114 via network 102.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated (e.g., by content server 112) in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by user devices 108, etc.) and used by content server 112.

Computer system 100 is shown to include data storage devices 110. Data storage devices 110 may be any type of memory device capable of storing profile data, content item data, accounting data, or any other type of data used by log file processing system 114 or another component of computer system 100. Data storage devices 110 may include any type of non-volatile memory, media, or memory devices. For example, data storage devices 110 may include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks. In some implementations, data storage devices 110 may be local to content server 112, log file processing system 114, or content providers 106. In other implementations, data storage devices 110 may be remote data storage devices connected with content server 112 and/or log file processing system 114 via network 102. In some implementations, data storage devices 110 may be part of a data storage server or system capable of receiving and responding to queries from content server 112.

Computer system 100 is shown to include a content server 112. Content server 112 may receive a request for a content item from resources 104 and/or user devices 108. In some implementations, the request for content items may include characteristics of one or more content slots in which the content items will be displayed. For example, such characteristics may include the URL of the resource 104 in which the content slot is located, a display size of the content slot, a position of the content slot, and/or media types that are available for presentation in the content slot. If the content slot is located on a search results page, keywords associated with the search query may also be provided to content server 112. The characteristics of the content slot and/or keywords associated with the content request may facilitate identification of content items that are relevant to resources 104 and/or to the search query.

Content server 112 may select an eligible content item in response to the request received from resources 104 or user devices 108. In some implementations, eligible content items may include content items having characteristics matching the characteristics of the content slots in which the content items are to be presented. For example, content server 112 may select a content item having a display size which fits in a destination content slot. In some implementations, content server 112 may resize a selected content item to fit a content slot or add additional visual content to the selected content item (e.g., padding, a border, etc.) based on the display size of the content item and the display size of the content slot.

In some implementations, content server 112 may select a content item determined to be relevant to a particular resource 104, user device 108, or search query. For example, content server 112 may select a content item by comparing the keywords associated with each content item (e.g., specified by content providers 106, additional keywords extracted from the content item, etc.) with the keywords associated with the resource 104 or user device 108 requesting the content item. A topic or type of content included in resources 104 may be used to establish keywords for resources 104.

In some implementations, content server 112 may select a content item by comparing the keywords associated with each content item with information (e.g., profile data, user preferences, etc.) associated with a particular user device 108 requesting the content item. In some implementations, content server 112 may select a content item that does not match established user preferences if an insufficient number of preferred content items are available. In some implementations, content server 112 may select a content item based on an established click-through-rate, a predicted click-through-rate, a bid price associated with each content item, or other relevant selection criteria.

Content server 112 may generate a variety of events when a user action occurs. For example, content server 112 may generate events in response to receiving a request for a content item, selecting an eligible content item, and/or delivering the content item to user devices 108. The events generated by content server 112 may relate to the distribution and selection of content items and may be communicated to log file processing system 114 via network 102.

Computer system 100 is shown to include a log file processing system 114. Log file processing system 114 may be configured to receive user actions from other components of computer system 100 and/or from data sources outside system 100 (e.g., via network 102). Log file processing system 114 may generally store the user actions as log files in one or more databases and process the log files. The processed log files may then be used by various components of computer system 100. For example, content providers 106 may use the log files to help determine a campaign strategy, content server 112 may use the log files to determine which content to provide to a user device 108, data storage devices 110 may store the processed data, etc.

Figure 2:
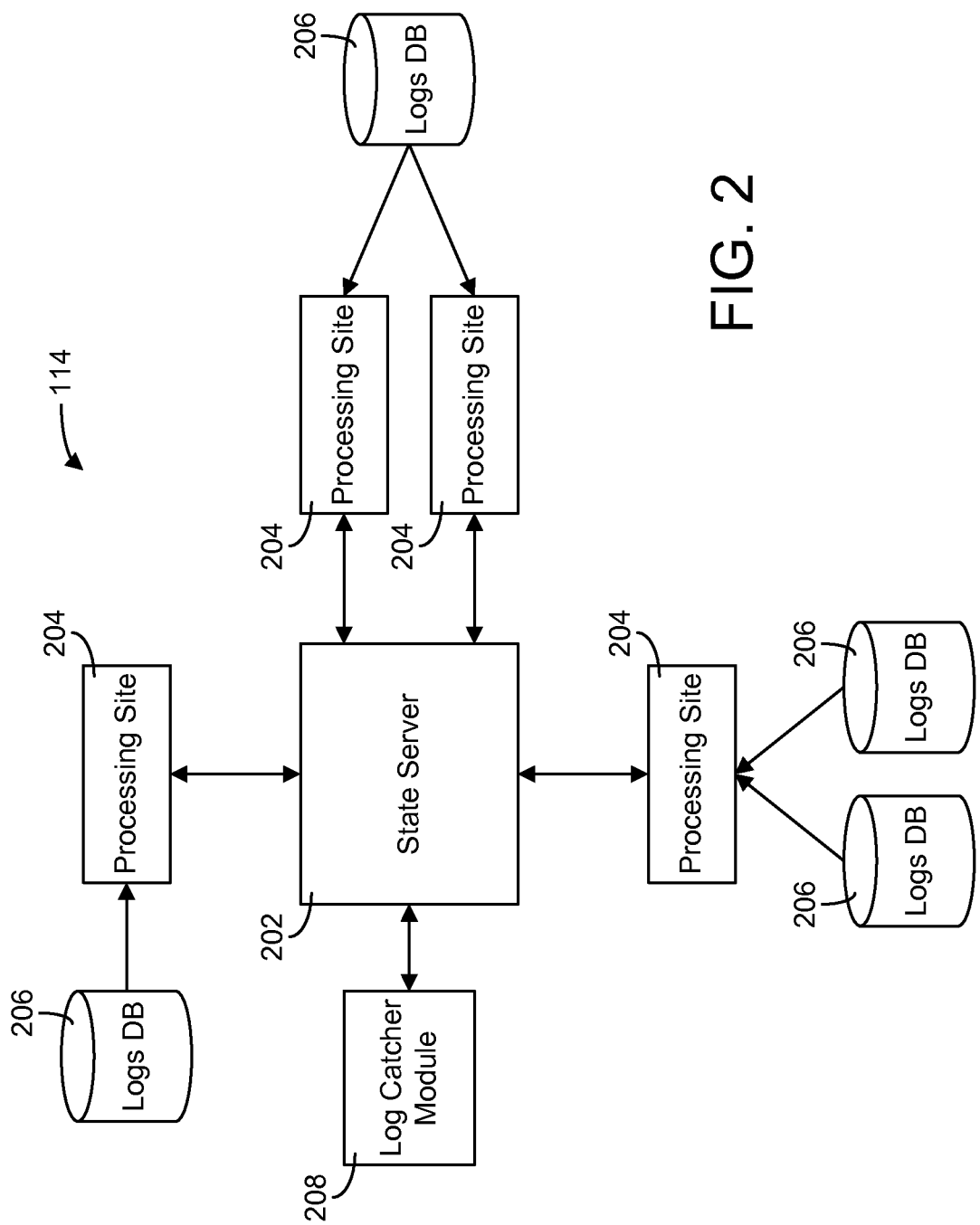
FIG. 2 is a detailed block diagram of the log file processing system of FIG. 1, according to a described implementation.

Referring also to FIG. 2, the activities of log file processing system 114 are shown in greater detail. Log file processing system 114 is shown to include a state server 202 configured to manage log file processing. In some implementations, state server 202 is built on a fault tolerant and disaster free database-like infrastructure (e.g., paxosdb, spanner, etc.). State server 202 may generally create bundles which include unprocessed data (e.g., unprocessed data relating to user actions provided to log file processing system 114). The bundles may then be assigned to a pipeline (e.g., one or more processing sites 204) for processing. Processing sites 204 may process the data and store the data in one or more log databases 206. In the present disclosure, the terms "pipeline" and "processing site" may be interchangeable.

In the implementation of FIG. 2, one processing site 204 may be connected with a single log database 206, two log databases 206 may be connected with a single processing site 204, and two processing sites 204 may be connected with a single log database 206. It should be understood that in various implementations, any number of processing sites may be included in log file processing system 114, any number of log databases may be associated with a processing site, and multiple processing sites may be associated with a single log database.

Log databases 206 may generally store user actions in log files. For example, user actions received at log file processing system 114 may be written to log files and stored in log databases 206. The log files may include log metadata, non-processed events, processed events, clustered or bundled events, or any combination thereof. In some implementations, log databases 206 store log statistics associated with the log files. For example, the log statistics may include a plurality of statistical data points describing the log files. Each of the statistical data points may include a size value indicating a data size of the log file and a time value indicating a time at which the corresponding size value was observed. The log statistics may be stored with the log files (e.g., as metadata) or separately from the log files.

Log file processing system 114 is shown to include a log catcher module 208. Log catcher module 208 may be configured to receive user actions and write the user actions to a log file. The log file may be stored in a log database 206. In some implementations, each user action stored in the log file may be associated with a data offset defining the location of the user action in the log file. The data offsets associated with the events may be stored as log metadata as part of the log file and/or separately from the log file in state server 202. In other implementations, the data offsets for particular user actions may be unknown. As the log file is processed, the log file data may include alternating blocks of processed bytes and non-processed bytes. The starting data offset for a non-processed block may be known (e.g., based on the ending data offset for the preceding processed block) and used as the data offset for all bytes and/or events in the non-processed block. While FIG. 2 illustrates log catcher module 208 coupled to each log database 206 through state server 202, log catcher module 208 may be configured to communicate directly to each log database 206 or through any number of paths.

Figure 3:
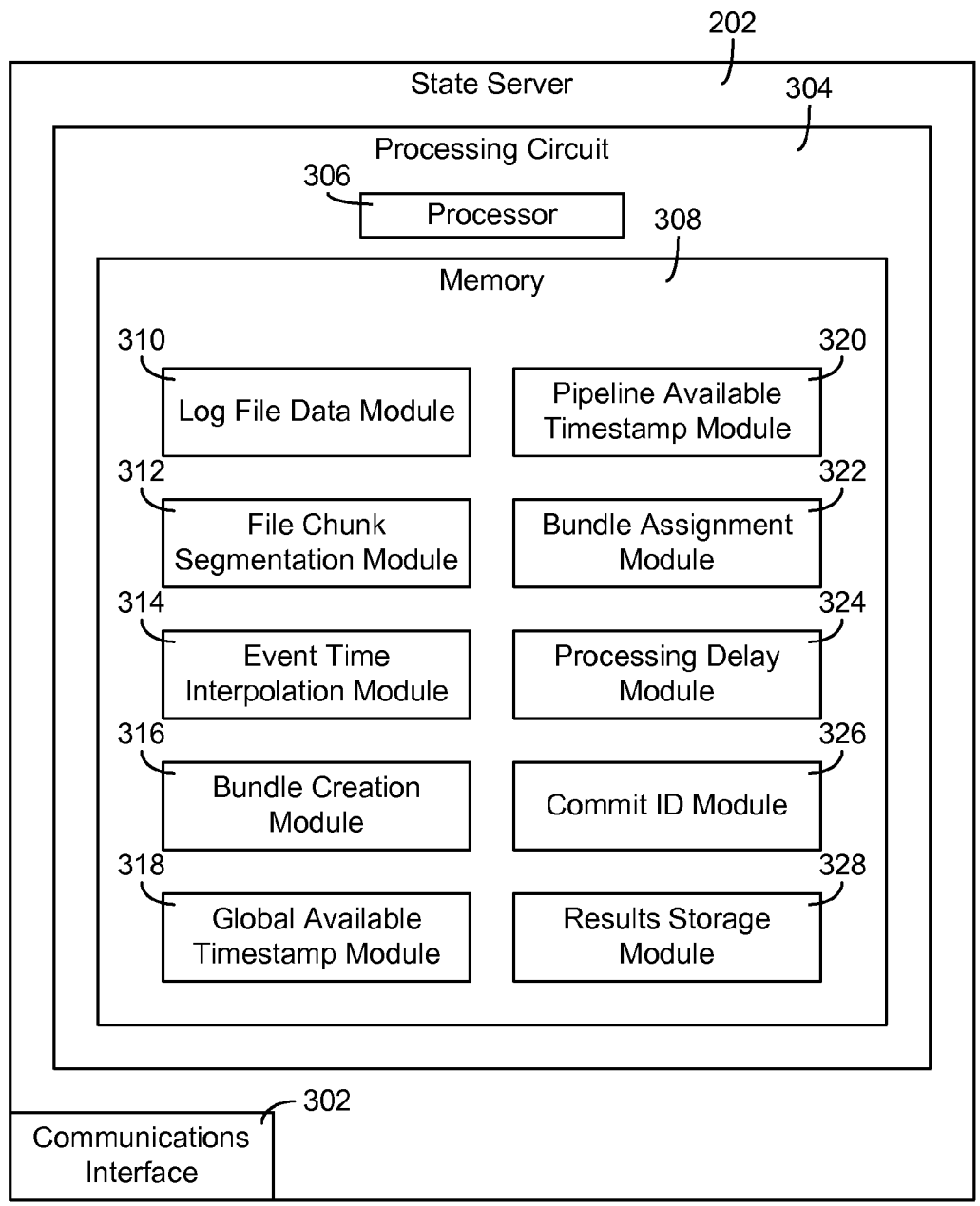
FIG. 3 is a detailed block diagram of a state server of the log file processing system, according to a described implementation.

Referring now to FIG. 3, the activities of state server 202 are shown in greater detail. State server 202 is shown to include a communications interface 302 and a processing circuit 304. Communications interface 302 may include wired or wireless interfaces (e.g., jacks, antennas, transmitters, receivers, transceivers, wire terminals, Ethernet ports, WiFi transceivers, etc.) for conducting data communications with local or remote devices or systems. For example, communications interface 302 may allow log file processing system 114 to communicate with network 102, resources 104, content providers 106, user devices 108, data storage devices 110, and content server 112.

Processing circuit 304 includes a processor 306 and memory 308. Processor 306 may be implemented as a general purpose processor, an application specific integrated circuit (ASIC), one or more field programmable gate arrays (FPGAs), a CPU, a GPU, a group of processing components, or other suitable electronic processing components. Memory 308 may include one or more devices (e.g., RAM, ROM, flash memory, hard disk storage, etc.) for storing data and/or computer code for completing and/or facilitating the various processes, layers, and modules described in the present disclosure. Memory 308 may include volatile memory or non-volatile memory. Memory 308 may include database components, object code components, script components, or any other type of information structure for supporting the various activities and information structures described in the present disclosure. In some implementations, memory 308 is communicably connected to processor 306 via processing circuit 304 and includes computer code (e.g., data modules stored in memory 308) for executing one or more processes described herein.

Memory 308 is shown to include a log file data module 310. Log file data module 310 may be configured to maintain metadata about each log file in each log database 206. Log file data module 310 may receive metadata from log file tracker module 210 or from each database 206. The metadata for each log file may include the log file basename, the current size of the log file, file paths to replicated copies of the log file, and other such information. Log file data module 310 may receive metadata for a new log file or updated metadata for an existing log file.

Memory 308 is shown to include a file chunk segmentation module 312. File chunk segmentation module 312 may be configured to split large chunks of data into smaller chunks of data for later processing. In one implementation, file chunk segmentation module 312 may retrieve an unprocessed log file of any size. The unprocessed file chunk may span a large time window (e.g., take a long time to process). If a large file chunk is sent for processing, other unprocessed file chunks with a smaller time span may be significantly delayed. Further, the resource usage of a local processing pipeline by state server 202 may become harder to control when the pipelines is processing a larger file chunk. File chunk segmentation module 312 may segment the larger file chunks into smaller chunks to avoid such a situation. The file chunks may be sized such that the file is not too fragmented but is still small enough to control a processing delay of the file chunk.

Memory 308 is shown to include an event time interpolation module 314. Event time interpolation module 314 may be configured to determine an event time for each file chunk or segment to be processed. The event time may generally be a timestamp associated with the file chunk (e.g., when user actions were written to the log file or when user actions occurred). If the file chunk is sufficiently small, the event time may simply be the timestamp.

In some implementations, state server 202 uses an interpolation method to define an event time for each unprocessed file chunk. Interpolation may be used for log files which increase in size (e.g., continues to receive user actions). Using data collected by log file tracker module 210, state server 202 may interpolate between observation points (e.g., times at which data is written to the log files) to determine an event time for any byte offset in a log file. For example, log file tracker module 210 may observe that a log file has a size M at timestamp $T_M$ and a size N at timestamp $T_N$, where M>N and $T_M$<$T_N$. For any byte offset Z between M and N, an event time can be approximated using the formula:

$$T_M + (Z - M) \times \frac{T_N - T_M}{N - M}.$$

If the file chunk size is sufficiently small, the calculated event time may represent the event time of the entire file chunk.

State server 202 may prioritize file chunks with an earlier event time. For example, for a file chunk with a first event time X and a second file chunk with a second event time Y such that X<Y, the first file chunk may be processed first. In order to minimize any delay, file chunks are prioritized based on the event time. In general, state server 202 may dispatch file chunks in a first event time or timeframe before dispatching file chunks in a second event time or timeframe. The file chunks may be dispatched in a breadth first manner instead of a depth first manner (e.g., across all processing sites instead of across all resources at a single processing site at a time).

Memory 308 is shown to include bundle creation module 316. Bundle creation module 316 may generally group multiple file chunks into a single bundle or segment. Bundle creation module 316 may favor grouping file segments from multiple files instead of one file, such that a local processing pipeline can implement parallelism easily. Bundle creation module 316 may further assign a unique identifier (ID) to each bundle.

Bundle creation module 316 may group file chunks from a same timeframe together. This may allow state server 202 to more easily control a processing delay for the file chunks and the resource usage of log file processing system 114. For file chunks with very few bytes, bundle creation module 316 may hold off including the file chunks in a bundle for a period of time, to allow the file chunk to grow with new data. If the file chunk size is still too small after a predetermined time, the file chunk may be included anyway in a bundle for timely processing.

As a result of the activities of modules 310-316, state server 202 may use log files stored in databases 206 to create many bundles of unprocessed data to be processed by a processing site 204 in a processing pipeline. Each bundle may include file chunks or segments from one or more log files, and may be associated with one or more event times or timestamps that state server 202 may use to determine the order in which to send out each bundle.

Memory 308 is shown to include a global available timestamp (GAT) module 318, pipeline available timestamp (PAT) module 320, and bundle assignment module 322. GAT module 318 and PAT module 320 may generally be configured to assign timestamps to each bundle that a bundle assignment module 322 may use to help determine when to assign a bundle to a processing site 204. Bundle assignment module 322 may be configured to assign the bundle to a particular processing site.

Bundles may be assigned to a local processing site 204 upon request. A local processing site may run a bundle retriever process (described in greater detail in FIG. 4) to request one or more bundles from state server 202. Bundle assignment module 322 may receive the request and determine, for a bundle, if all file chunks in the bundle are available in a log database closest to the local processing site, and whether the bundle is available for assignment to the requesting processing site.

Checking whether the bundle is available for assignment to a particular local processing site may include checking the GAT and PAT of the bundle. The GAT is a function of the estimated processing time of the bundle. If the current time is newer than the GAT, the bundle is eligible to be assigned to any eligible processing site (e.g., to any processing site that has access to all file chunks in the bundle at the closest log database). GAT module 318 may assign and determine the GAT for each bundle. The PAT is a pair of values indicating a specific processing site and a specific time. The time may be a time indicating when the bundle may be processed as described above. For example, for a pair of values $\{P_B, t\}$, the PAT may indicate that the bundle may be eligible to be assigned to processing site $P_B$ after time t. PAT module 320 may assign and determine the PAT for each bundle. Bundle assignment module 322 may assign a bundle to a processing site if both the GAT value and PAT value are satisfied.

Once a bundle is assigned to a particular processing site, the GAT and PAT of the bundle may be updated by GAT module 318 and PAT module 320, respectively. In one implementation, GAT module 318 may set the GAT of the bundle to a future time (e.g., 30 minutes later) and PAT module 320 may set the PAT of the bundle to a time later in the future (e.g., 24 hours). In such an implementation, the bundle is prevented from being assigned to any other processing site within 30 minutes. This allows the processing site to which the bundle has been assigned a 30 minute window to complete the processing of the data. If the processing is not done after 30 minutes, then the GAT expires and the bundle becomes eligible to be assigned to another processing site. Further, the bundle is prevented from being assigned to the same processing site for 24 hours. If processing is not complete after 24 hours, then the PAT expires and the bundle is eligible to be reassigned to the original requesting processing site.

In one implementation, a bundle's GAT and PAT may be extended by specified lengths by state server 202 or a processing site 204. If the local processing site 204 needs additional time to process a particular bundle, and does not want to lose ownership of the bundle (e.g., have the bundle assigned to another processing site), the GAT and/or PAT may be extended by GAT module 318 and PAT module 320, respectively.

Memory 308 is shown to include a processing delay module 324. Processing delay module 324 may be configured to determine a processing delay associated with each local processing site or local pipeline. Processing delay module 324 may determine the processing delay based on past activity in the local pipeline, via an interpolative method, or via any other method. Processing delay module 324 may determine an average processing time for a bundle. GAT module 318 and PAT module 320 may then use the average processing time to compute a GAT and PAT for each bundle as described above.

By carefully assigning the values of the GAT and PAT, state server 202 may ensure that the majority of work done by log file processing system 114 is shared among the multiple pipelines and only a minimal amount of work is duplicated. The GAT may be directly associated with the amount of duplicate processing. For example, if the GAT is 80% of the local processing site's processing time, the expected amount of resources spent due to duplicate processing will be 20%. In other words, 20% of the time, the bundle committed to the processing site will be reassigned to another processing site since the original processing site has not finished processing the bundle. In one implementation, the GAT may be chosen by GAT module 318 to be a little longer than 90% of a local processing site's processing time, to allow most bundles assigned to the processing site to be completed in time.

The PAT may be much longer than the GAT, but not infinite (e.g., bounded). For example, if a local processing site happens to be destroyed and rebuilt, the processing site may lose all requested bundles received. With a long but still bounded PAT, this processing site may get a second chance to process all of the bundles (e.g., after 24 hours when the PAT expires) if the bundles are still available.

As the result of the activities of modules 318-324, bundles may be assigned to one or more processing sites or pipelines for processing. After processing, state server 202 may receive the results and manage the results via modules 326-328.

Memory 308 is shown to include commit ID module 326. Commit ID module 326 may be configured to check commit IDs for each bundle. When a bundle is assigned to a processing site, a unique commit ID is assigned to the bundle (e.g., by the processing site). The commit IDs assigned to each bundle may be unique such that no two copies of a bundle have the same commit ID. If a bundle is assigned to multiple processing sites, each bundle assignment may have a different commit ID to distinguish between the multiple assignments.

When a bundle is processed by a local processing site, the bundle is committed back to state server 202. The commit process notifies state server 202 that the bundles are consumed and informs state server 202 of any output results.

Since one bundle may be assigned multiple times as described above, the bundle may be committed multiple times by one or multiple processing sites. The commit ID may be used to distinguish between each bundle commitment. This commit ID may be sent to commit ID module 326 when the bundle is committed back to state server 202.

When the bundle is committed for the first time to state server 202, commit ID module 326 may record the commit ID. If the bundle is committed again, commit ID module 326 may compare the commit ID with the already recorded commit ID for the bundle. If the commit IDs are the same, then the bundle is the same copy, and state server 202 may ignore the current commit request from the processing site but acknowledge the commit success. If the commit IDs are different, then the two bundles are different copies, and state server 202 may consider the current commit attempt a failure. The use of the commit ID may ensure that a bundle is committed to state server 202 only once (e.g., the data is processed and recorded only once by state server 202). Further, duplicative work by the processing pipelines may be monitored through the commit failures.

Memory 308 is further shown to include results storage module 328. Results storage module 328 may be configured to store the results of the processing. The results may then be accessed by resources 104, content providers 106, user devices 108, data storage devices 110, content server 112, or another component of computer system 100.

Figure 4:
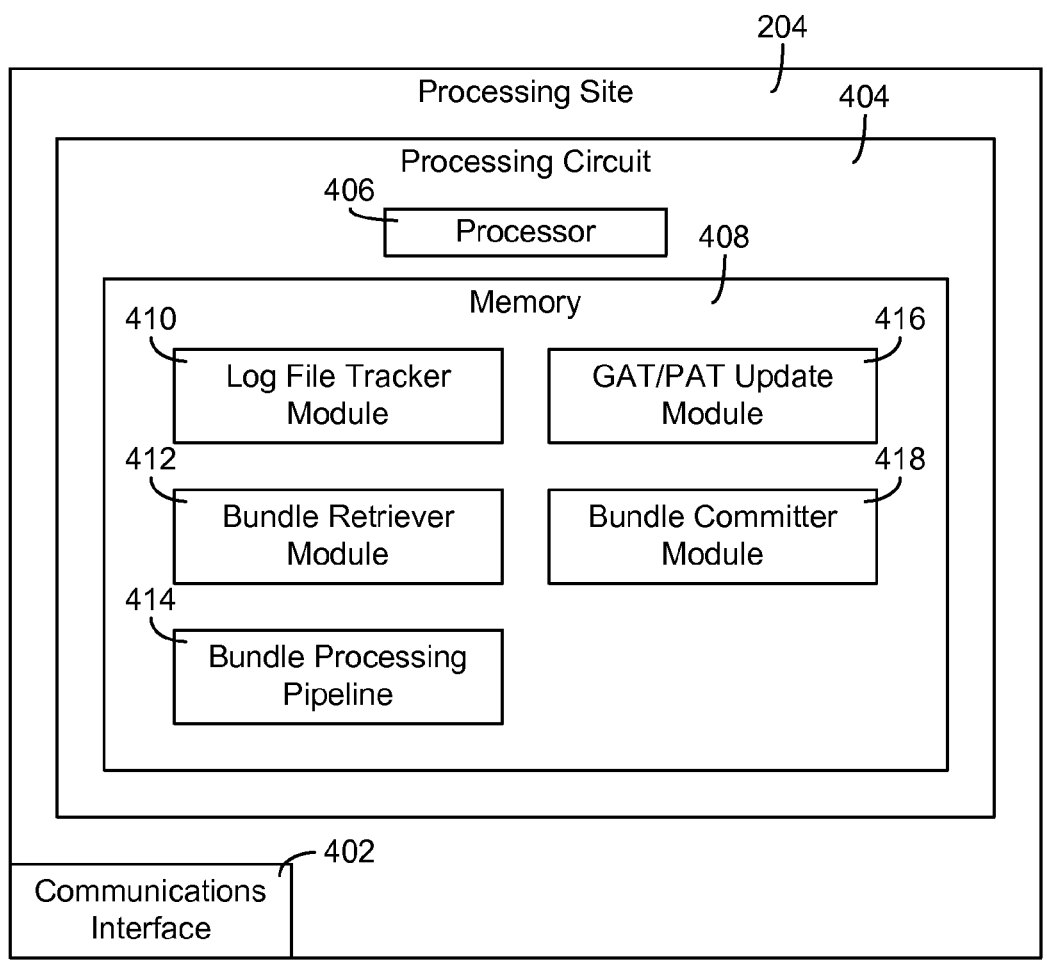
FIG. 4 is a detailed block diagram of a processing site of the log file processing system, according to a described implementation.

Referring now to FIG. 4, a processing site 204 (e.g., a processing pipeline) is shown in greater detail. Processing site 204 is shown to include a communications interface 402, processing circuit 404, processor 406, and memory 408, which may all have the same general functionality as described with reference to components 302-308 of FIG. 3.

Memory 408 is shown to include a log file tracker module 410. Log file tracker module 410 may be configured to read log metadata from a log file in a local log database 206 and send the log metadata to state server 202. Log file tracker module 410 may proactively check for new log files and monitor the growth of existing log files in log database 206. Log file tracker module 410 may register each new log file and file growth with state server 202 and more particularly a log file data module 410 of state server 202. By checking for new log files and monitoring existing log files, log file processing system 114 may therefore be able to process the log files with minimal delay, as close to real-time as possible, since log files to process may be identified sooner.

Memory 408 is shown to include a bundle retriever module 412. Bundle retriever module 412 may be configured to request a bundle assignment from state server 202. After receiving confirmation of a bundle to process from state server 202, bundle retriever module 412 may retrieve the one or more associated log files in its associated local log database 206. Memory 408 is shown to include a bundle processing pipeline 414. Bundle processing pipeline 414 processes the bundles and generates results.

Memory 408 is shown to include a GAT/PAT update module 416. GAT/PAT update module 416 may be configured to receive a GAT and/or PAT from state server 202 and to update the GAT and PAT for the bundle. In one implementation, processing site 204 may determine an estimated processing time for the bundle and may use the estimated processing time to update the GAT. GAT/PAT update module 416 may further provide an updated GAT/PAT, or other processing information, to state server 202.

Memory 408 is shown to include a bundle committer module 418. Bundle committer module 418 may be configured to submit commit requests and a commit ID of the bundle to state server 202 after a bundle is processed. The results of the processing may be provided to state server 202 as well if applicable.

Figure 5:
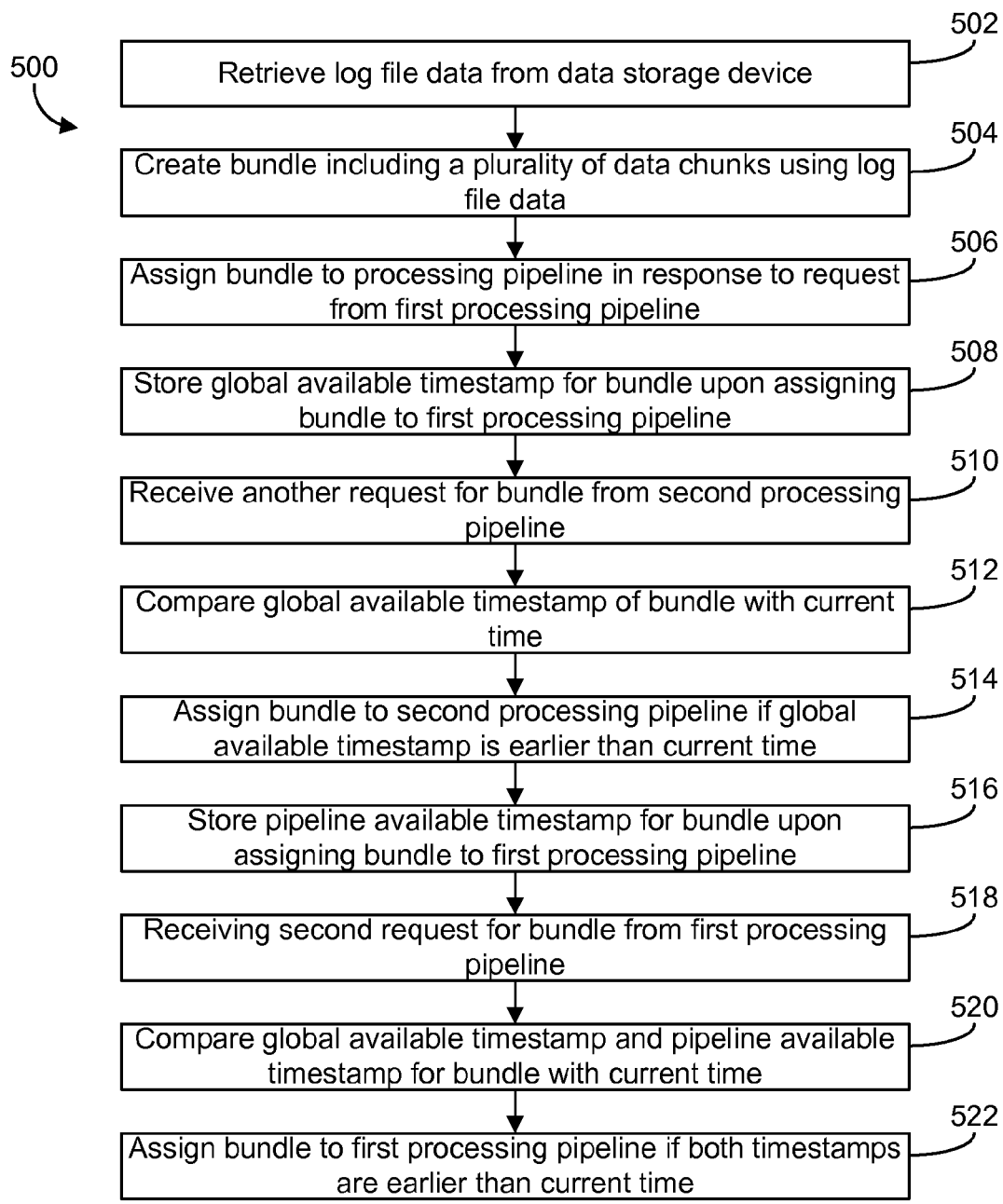
FIG. 5 is a flow chart of a process for executing the log file processing system of the present disclosure, according to a described implementation.

Referring now to FIG. 5, a flow chart of a process 500 for executing the log file processing system of the present disclosure is shown, according to a described implementation. Process 500 may be executed by, for example, state server 202. Process 500 may generally include assigning a bundle to one or more processing pipelines for processing. Process 500 may be designed to assign bundles such that bundles are not assigned to multiple processing pipelines unless a first processing pipeline is taking too long to process bundles.

Process 500 includes retrieving log file data from a data storage device (step 502). The log file data may be retrieved from one or more log databases. Process 500 includes creating a bundle including a plurality of data chunks using the log file data (step 504). Step 504 may include determining and splitting file chunks, determining an event time for each file chunk, and creating bundles including one or more of the file chunks.

Process 500 includes assigning the bundle to a processing pipeline in response to a request form a first processing pipeline (step 506). The first processing pipeline may be one of a set of multiple processing pipelines configured to process data. Process 500 includes storing a global available timestamp for the bundle upon assigning the bundle to the first processing pipeline (step 508). The global available timestamp is a time threshold before which the bundle is ineligible to be assigned to another processing pipeline.

Process 500 may include receiving another request for the bundle from a second processing pipeline (step 510). Process 500 may include identifying the stored global available timestamp of the bundle and comparing the timestamp with a current time (step 512). If the stored global available timestamp is earlier than the current time, the bundle may be assigned to the second processing pipeline (step 514). In other words, if the first processing pipeline is taking too long to process the bundle, the second processing pipeline may then be assigned the bundle.

Process 500 may include storing a pipeline available timestamp for the bundle (step 516). The pipeline available timestamp is a time threshold before which the bundle is ineligible to be reassigned to the first processing pipeline. The pipeline available timestamp only applies to the first processing pipeline. Process 500 may include receiving a second request for the bundle from the first processing pipeline (step 518). Process 500 may include identifying the stored global available timestamp and pipeline available timestamp of the bundle and comparing both timestamps with a current time (step 520). If both timestamps are earlier than the current time, the bundle may be reassigned to the first processing pipeline (step 522). In other words, the first processing pipeline may be reassigned the same bundle for processing.

It should be understood that in application of process 500, various steps may be re-arranged or omitted. For example, steps 510-522 may not be applied if the first processing pipeline finishes processing the bundle before the global available timestamp expires. As another example, steps 508, 516 may happen concurrently when the bundle is originally assigned.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The construction and arrangement of the systems and methods as shown in the various exemplary implementations are illustrative only. Although only a few implementations have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions and arrangement of the exemplary implementations without departing from the scope of the present disclosure.

The present disclosure contemplates methods, systems and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A log file processing system comprising:
   a data storage device; and
   a processing circuit configured to retrieve log file data from the data storage device and to create a bundle comprising a plurality of data chunks using the log file data;
   wherein the processing circuit is configured to assign the bundle to a first processing pipeline of a set of multiple processing pipelines in response to a request from the first processing pipeline; and
   wherein the processing circuit is configured to store a global available timestamp for the bundle upon assigning the bundle to the first processing pipeline, wherein the global available timestamp is a time threshold before which the bundle is ineligible to be assigned to any of the multiple processing pipelines.

2. The system of claim 1, wherein the processing circuit is configured to store a pipeline available timestamp for the bundle upon assigning the bundle to the first processing pipeline, wherein the pipeline available timestamp is a time threshold before which the bundle is ineligible to be reassigned to the first processing pipeline, wherein the pipeline available timestamp applies only to the first processing pipeline.

3. The system of claim 1, wherein the processing circuit is configured to identify an estimated processing time of the first processing pipeline;
   wherein the global available timestamp is a function of the estimated processing time.

4. The system of claim 1, wherein the processing circuit is configured to receive a request to commit the bundle from a processing pipeline and to determine whether another request to commit the bundle was previously received;
   wherein the processing circuit is configured to commit the bundle if another request to commit the bundle was not previously received, and wherein the processing circuit is configured to not commit the bundle if another request to commit the bundle was previously received.

5. The system of claim 1, wherein the processing circuit is configured to assign a commit identifier to the bundle upon assigning the bundle to the first processing pipeline, wherein the commit identifier distinguishes a copy of the bundle assigned to the first processing pipeline from a copy of the bundle assigned to another processing pipeline;
   wherein the processing circuit is configured to send the commit identifier along with the bundle to the first processing pipeline.

6. The system of claim 1, wherein the processing circuit is configured to receive a request to commit the bundle from a processing pipeline, the request to commit the bundle comprising a commit identifier, wherein the commit identifier distinguishes a copy of the bundle assigned to the first processing pipeline from a copy of the bundle assigned to another processing pipeline;
   wherein the processing circuit is configured select and perform one or more actions from a plurality of potential actions in response to the request to commit the bundle, wherein the selection is based on the commit identifier.

7. The system of claim 6, wherein the processing circuit is configured to determine whether another request to commit the bundle was previously received;
   wherein the processing circuit is configured to store the commit identifier in response to a determination by the processing circuit that another request to commit the bundle was not previously received.

8. The system of claim 6, wherein the processing circuit is configured to compare the commit identifier with a previously stored commit identifier for the bundle;
   wherein if the commit identifier matches the previously stored commit identifier, the one or more actions selected and performed by the processing circuit include reporting a commit success and not committing the bundle.

9. The system of claim 6, wherein the processing circuit is configured to compare the commit identifier with a previously stored commit identifier for the bundle;
   wherein if the commit identifier does not match the previously stored commit identifier, the one or more actions selected and performed by the processing circuit include reporting a commit failure and not committing the bundle.

10. The system of claim 1, wherein each of the plurality of data chunks is associated with an event time;
  wherein creating the bundle comprises selecting the plurality of data chunks based on the event times, wherein the processing circuit is configured to prioritize selecting data chunks having relatively earlier event times over selecting data chunks having relatively later event times.

11. The system of claim 10, wherein the processing circuit is configured to determine the event times associated with the plurality of data chunks using an interpolative process comprising:
  identifying a plurality of statistical data points for a log file, wherein each of the statistical data points includes a time value and a size value, the size value indicating a file size of the log file at a time corresponding to the time value; and
  interpolating a new data point between the plurality of statistical data points for the log file, the new data point having an interpolated time value, wherein the interpolated time value is interpolated using a data offset associated with the data chunk.

12. The system of claim 1, wherein creating the bundle comprises selecting each of the plurality of data chunks, wherein the processing circuit is configured to prioritize selecting data chunks from a plurality of different log files.

13. A method for processing log files, wherein the method is performed by a processing circuit of a log file processing system, the method comprising:
  retrieving log file data from a data storage device;
  creating a bundle comprising a plurality of data chunks using the log file data;
  assigning the bundle to a first processing pipeline of a set of multiple processing pipelines in response to a request from the first processing pipeline; and
  storing a global available timestamp for the bundle upon assigning the bundle to the first processing pipeline, wherein the global available timestamp is a time threshold before which the bundle is ineligible to be assigned to any of the multiple processing pipelines.

14. The method of claim 13, further comprising:
  receiving a second request for the bundle from a second processing pipeline of the multiple processing pipelines;
  identifying the stored global available timestamp for the bundle in response to the second request;
  comparing the stored global available timestamp with a current time; and
  assigning the bundle to the second processing pipeline if the stored global available timestamp is earlier than the current time.

15. The method of claim 14, further comprising:
  storing a pipeline available timestamp for the bundle in a data storage device upon assigning the bundle to the first processing pipeline, wherein the pipeline available timestamp is a time threshold before which the bundle is ineligible to be reassigned to the first processing pipeline, wherein the pipeline available timestamp applies only to the first processing pipeline.

16. The method of claim 15, further comprising:
  receiving a second request for the bundle from the first processing pipeline;
  identifying both the stored global available timestamp and the stored pipeline available timestamp for the bundle in response to the second request;
  comparing both the stored global available timestamp and the stored pipeline available timestamp with a current time; and
  reassigning the bundle to the first processing pipeline if both the stored global available timestamp and the stored pipeline available timestamp are earlier than the current time.

17. A log file processing system comprising:
  a processing circuit configured to submit a request for a bundle to a state server, the bundle comprising a plurality of log file data chunks;
  wherein the processing circuit is configured to receive a bundle assignment from the state server in response to the request and to identify a commit identifier associated with the assigned bundle, wherein the commit identifier distinguishes a copy of the bundle assigned to a first log file processing pipeline from a copy of the bundle assigned to a second log file processing pipeline;
  wherein the processing circuit is configured process the bundle and to submit a request to commit the processed bundle to the state server, the request to commit the bundle comprising the commit identifier.

18. The system of claim 17, wherein the processing circuit is configured to receive a global available timestamp for the assigned bundle from the state server, wherein the global available timestamp is a time threshold past which the bundle is eligible to be assigned to any of multiple processing pipelines;
  wherein the processing circuit is configured update the global available timestamp and store the updated global available timestamp in a data storage device.

19. The system of claim 17, wherein the processing circuit is configured to identify an estimated processing time for the log file processing pipeline;
  wherein the processing circuit is configured to use the estimated processing time to calculate the updated global available timestamp, wherein the updated global available timestamp is a function of the estimated processing time.

20. The system of claim 17, wherein the processing circuit is configured to track one or more log files, wherein tracking a log file comprises:
  collecting a plurality of statistical data points for the log file, wherein each of the statistical data points includes a time value and a size value, the size value indicating a file size of the log file at a time corresponding to the time value; and
  storing the plurality of statistical data points in a data storage device.

* * * * *